Aug. 24, 1926.

DE WITT C. CONKLING

1,597,179

PLANETARY GEAR

Filed June 16, 1917    6 Sheets-Sheet 5

Aug. 24, 1926.

DE WITT C. CONKLING 1,597,179

PLANETARY GEAR

Filed June 16, 1917    6 Sheets-Sheet 6

Patented Aug. 24, 1926.

1,597,179

UNITED STATES PATENT OFFICE.

DE WITT C. CONKLING, OF NEW YORK, N. Y.

PLANETARY GEAR.

Application filed June 16, 1917. Serial No. 175,166.

This invention relates to a planetary gear mechanism and particularly to one which is adapted for use in automobile structures or the like.

The object of the invention is to provide a speed-changing power transmission mechanism by means of which the speed-changes may be effected gradually and smoothly.

A further object is to provide a speed-changing device in which the strains are well balanced and are gradually applied at all times.

A further object is to provide a simple and efficient means whereby a single hand-control element may be readily made to produce either a neutral position, a reverse position, a low speed position, a second speed position, or a third speed position of the gear mechanism.

A further object is to provide auxiliary control means adapted to produce a neutral position of the gear mechanism at any desired time.

A further object is to provide means whereby the rotation of the shaft whose motion is transmitted may be made to supply the necessary power to effect the various speed changes.

A further object is to so arrange the parts of the device that the several shafts are provided with ample bearings and supporting means.

Other objects and aims of the invention, more or less specific than those referred to above, will be in part obvious and in part pointed out in the course of the following description of the elements, combinations, arrangements of parts and applications of principles, constituting the invention; and the scope of protection contemplated will be indicated in the appended claims.

In the accompanying drawings which are to be taken as a part of this specification, and in which I have shown merely a preferred form of embodiment of the invention:

In Fig. 5 the drive shaft is rotating but is transmitting no motion to the "driven" shaft, as when the gear is in "neutral" position. In Fig. 6 the parts of the gear mechanism are in "reverse" position, that is the drive shaft is transmitting motion to the driven shaft in a reverse direction. In Fig. 7 the parts of the gear mechanism are in "low speed" position, that is the drive shaft is transmitting motion to the driven shaft at a low speed. In Fig. 8 the parts of the gear mechanism are in "second speed" position, that is the drive shaft is transmitting motion to the driven shaft at a speed greater than that of Fig. 7. In Fig. 9 the parts of the gear mechanism are in a "high speed" position, that is the drive shaft is transmitting motion to the driven shaft at the same speed as its own.

Referring to the drawings for describing in detail the structure which is illustrated therein the reference character L indicates a casing, having bearings 1 and 2 at its opposite ends. This casing is intended to contain the elements of the gear mechanism which it is desired shall operate in oil, the casing being provided with a hand-hole 3 closed by a removable cover 4. If desired, the casing may be made in two halves connected together by suitable bolts as at 5.

The reference character G indicates the drive shaft. This may be the crank shaft of an engine or it may be a shaft connected with such crank shaft, or otherwise. It extends entirely through the casing, being received in both of the bearings 1 and 2 so as to be firmly and securely mounted.

The reference character H indicates the driven shaft. This may be connected with the traction wheels of an automobile, or otherwise, as desired. It enters the casing L through the bearing 2 and is made hollow so that it telescopes over the adjacent end portion of the drive shaft G so that in effect it constitutes a bearing for the adjacent end of the drive shaft. It extends for a considerable distance into the casing and thereby materially lengthens the bearing for the adjacent end of the drive shaft thus greatly stiffening and strengthening the drive shaft.

A gear 6 is fixed to the drive shaft within the casing, and a gear 7 is fixed to the driven shaft also within the casing. These gears may be made integral with their respective shafts or they may be separately formed and attached to the shafts in any suitable manner. As indicated, however, they are shown to be separately formed and to be attached to their respective shaft by means of a plurality of keys 8. These keys are preferably semi-circular as shown and are received in semi-circular pockets 9 formed in the shafts to receive them. The pockets are of such depth that the keys project laterally from the shafts and the projected portions are received in slots 10 formed in the gears. The bottom walls of the slots are inclined so as to hold the keys 8 in an inclined position, substantially as indicated, the result being that the keys constitute inclined abutments against which the bottom walls of the slots wedge to receive lateral thrust from the gears in one direction, (toward the right for the gear 6, toward the left for the gear 7, in Fig. 1). The gears may be readily slid along the shaft, however, in the opposite directions. This manner of mounting the gears upon the shafts provides easy and accurate assembling, maintains the gears rigidly upon the shafts when assembled, and at the same time makes the gears easily removable when it is desired to disassemble them from the shafts.

A clutch drum 11 is mounted loosely upon the drive shaft at the left of the gear 6. The flange 12 of this clutch drum provides a conical inner-surface 13, and a clutch member 14 is slidably mounted upon the drive shaft at the left of the drum to cooperate with the surface 13. The clutch member 14 is held against rotation upon the shaft preferably by means of one or more keys 15 fixed in the shaft and projecting laterally therefrom into slots 16 formed in the hub 17 of the clutch member.

The key or keys 15 may constitute an abutment, as at 18, between which and the gear 6 the hub 19 of the clutch drum 11 rotates. If desired a wearing collar 20 may be interposed between the abutment 18 and the adjacent end of the hub 19 to more accurately fill the space referred to, to compensate for inaccuracies of manufacture, and maintain the gear 6 in proper relation with the keys 8.

The hub 17 of the clutch member 14 is extended to the left and is provided with an annular run-way 21 within which the two lugs or rollers 22 of a clutch shifting lever 23 engage, said lever being pivoted upon the casing as at 24 and being extended to carry the lug or roller 25 which cooperates with a control cam 26 mounted upon a cam shaft 27.

The cam shaft 27 extends longitudinally of the casing, substantially parallel with the drive and driven shafts, and is mounted in bearings 28 at opposite ends of the casing. Within the casing it carries a plurality of other cams 29, 30, 31 and 32 for purposes which will be presently described, and one of its ends extends through the casing so that it may be engaged by any suitable operating means for determining the movements of the several cams.

A heavy spring 33 is interposed between the casing and the clutch member 14 operative normally to press the clutch member 14 against the clutch drum 11 whenever desired.

In order to economize space the spring 33 is preferably received within a recess 34 formed within the hub 17, one end of the spring engaging against an annular end wall 35 of said recess and the opposite end engaging against a collar 36 which preferably projects into the recess from the adjacent end wall of the casing.

The clutch drum 11 carries a plurality of small spindles or shafts 37 upon each of which is mounted a gear 38 all constantly in mesh with the gear 6. In the drawings three gears 38 are illustrated, being spaced equi-distant about the gear 6. The spindles 37 are shown to have heads 39 at their outer ends to retain the gears against displacement. The spindles are strong and substantial and their inner ends extend into sockets 40 formed in the clutch drum. They have reduced extensions projecting entirely through the web of the clutch drum and held in place by lock nuts 41 threaded thereonto.

A power-transmitting drum 42 is rotatably mounted upon the drive shaft at the right of the gear 6 and its annular flange 43 constitutes an internal gear, the teeth 44 of which are also in constant mesh with all of the gears 38. The hub 45 of the drum 42 is elongated so as to constitute a bearing for a brake drum 46. A suitable bearing sleeve 47 may be carried by the drum 46 to wear upon the hub 45 if desired. The right hand end of the hub 45, beyond the drum 46, is provided with a gear 48 disposed in close proximity with the gear 7 on the driven shaft H.

The hub 45 may be of such length as to extend from the gear 6 to the inner end of the shaft H if desired but preferably a wearing collar 49 is interposed to more properly fill this space and to compensate for inaccuracies in manufacture and assembling, the collar being made to rest against a slight annular shoulder 50 which is formed upon the shaft G in such relation so as to arrest any possible tendency of the parts at the right of the collar to press the gear 6 out of proper relation with its fixing keys.

The presence of the shaft H surrounding the right hand end portion of the shaft G lends such strength to the shaft G as enables a slight reduction in the diameter of the adjacent portion of the shaft G which is necessary to provide the shoulder 50.

The brake drum 46 carries a plurality of small spindles or shafts 51 upon each of which is mounted a gear 52 all constantly in mesh with the gear 48. In the drawings three gears 52 are illustrated, being spaced equi-distant about the gear 48. The spindles 51 are shown to be strong and substantial and their ends extend into sockets 53 formed in the clutch drum. They have reduced extensions projecting entirely through the web of the clutch drum and held in place by lock nuts 54 threaded thereonto.

Other and smaller gears 55 are made a part of or fixed one to each of the gears 52 concentric therewith and in constant mesh with the gear 7, the gear 7 being of larger diameter than the gear 48, as clearly illustrated.

Each pair of gears 52—55 thus constitute a double gear.

Since the spindles 51 for carrying the double gears are necessarily longer than the spindles 37 which carry the single gears 38 above described, it becomes desirable to support the outer ends of said spindles 51, and this is accomplished by providing a substantial ring 56 extending common to all of the spindles 51 and being fixed to the outer ends of said spindles. This ring serves also as a head for the spindles and prevents displacement of the gears therefrom. In order to support the ring in a more substantial manner lugs 57 extend outwardly from the drum 46 intermediate the gears and the ring is fixed to these also. For convenience and cheapness of manufacture the lugs 57 may be counterparts of the spindles 51 as illustrated if desired.

A clutch drum 58 is rotatably mounted upon the driven shaft H at the right of the gear 7, and its annular flange 59 constitutes an internal gear, the teeth 60 of which are also in constant mesh with all of the gears 52.

The gears 55 have no connection with the drum 58.

A friction disc clutch is arranged at the right hand side of the drum 58, said clutch comprising a plurality of friction discs 61 carried by the drum 58 and a plurality of other friction discs 62 which are carried by a sleeve 63. The sleeve 63 is fixed to the shaft H. The discs 62 are sandwiched between the discs 61 in the usual manner, and an annular plate 64, which is slidably mounted upon the sleeve 63 by means of the keys 65, is adapted to be moved back and forth for controlling the engagement of the discs 61 and 62. The plate 64 is provided with an annular run-way 66 within which two lugs or rollers 67 of a clutch-shifting lever 68 engage, said lever being pivoted upon the casing as at 69, and being extended to carry a lug or roller 70 which cooperates with the control cam 32 mounted upon the cam shaft 27.

The pivotal mounting for the lever 68 includes a slot 71 arranged transversely of the lever within which slot the pivot pin engages so as to permit the lever to have a limited bodily movement toward the right at the point of the pivot. A heavy compression spring 72 engages between the lever and the adjacent portion of the casing to urge the pivot portion of the lever normally toward the left so that the right hand end of the slot 71 rests against the pivot pin. The point of engagement by the spring is intermediate the pivot pin and the roller 70 so that the spring also serves to swing the lever normally into its off position against the surface of the cam. When the cam is operated to move the roller 70 toward the right, that is toward on position, the lever fulcrums about the pivot pin until the plate 64 is moved into approximately its final tightening position. Further movement of the roller 70 toward the right lifts the right hand end of the slot away from the pivot pin, and continued movement of the roller toward the right compresses the spring so that the pressure imparted to the plate 64 by the lever is a resilient pressure gradually applied by the spring. It is also as gradually released when the cam 32 allows the roller 70 to return toward the right.

It will be apparent that whenever the clutch 61—62 is tight, and the drum 58 thereby made rigid with the shaft H, no rotation of the gears 52—55 about their respective spindles will be possible, this due to the difference in diameter of said gears and their fixed relation to each other together with the fixed relation of the gear 7 with the gear 60. Whatever rotary motion therefore is imparted to the hub 45 and gear 48 of the drum 42 is transmitted without variation directly to the shaft H, the same as if said hub were an integral part of said shaft.

It will be apparent also, in this connection, that whenever the clutch 13—14 is tight, and the drum 11 thereby made rigid with the shaft G, no rotation of the gears 38 about their respective spindles will be possible. Whatever rotary motion therefore is imparted to the shaft G and clutch drum 11 is transmitted without variation directly to the drum 42 and the hub 45.

A brake-band 73 encircles the clutch drum 11 and is adapted to be controlled by the cam 29.

A brake-band 74 encircles the brake drum 46 and is adapted to be controlled by the cam 30.

A brake-band 75 encircles the clutch drum 58 and is adapted to be controlled by the cam 31.

Figure 2:
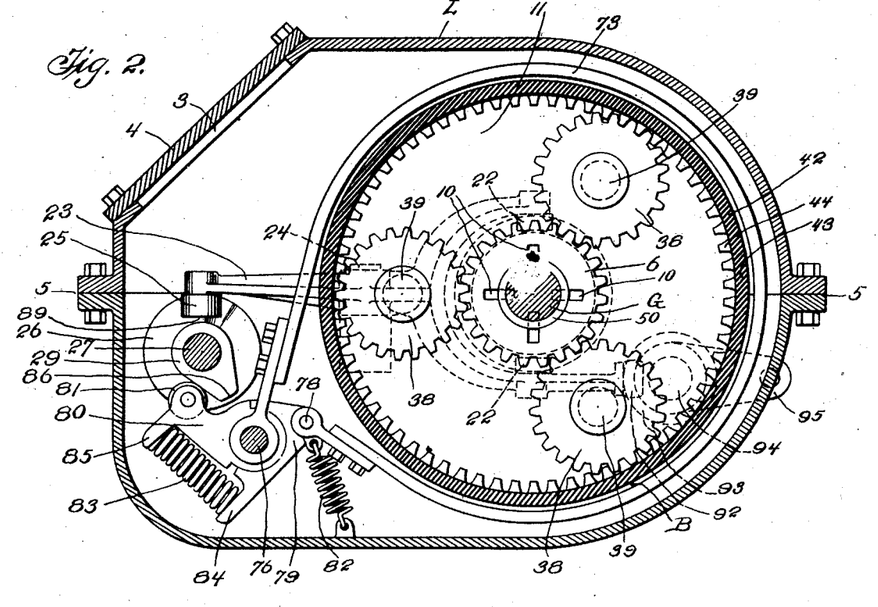
Figure 2 is a transverse sectional view taken substantially upon the plane of line II of Figure 1.
Figure 3:
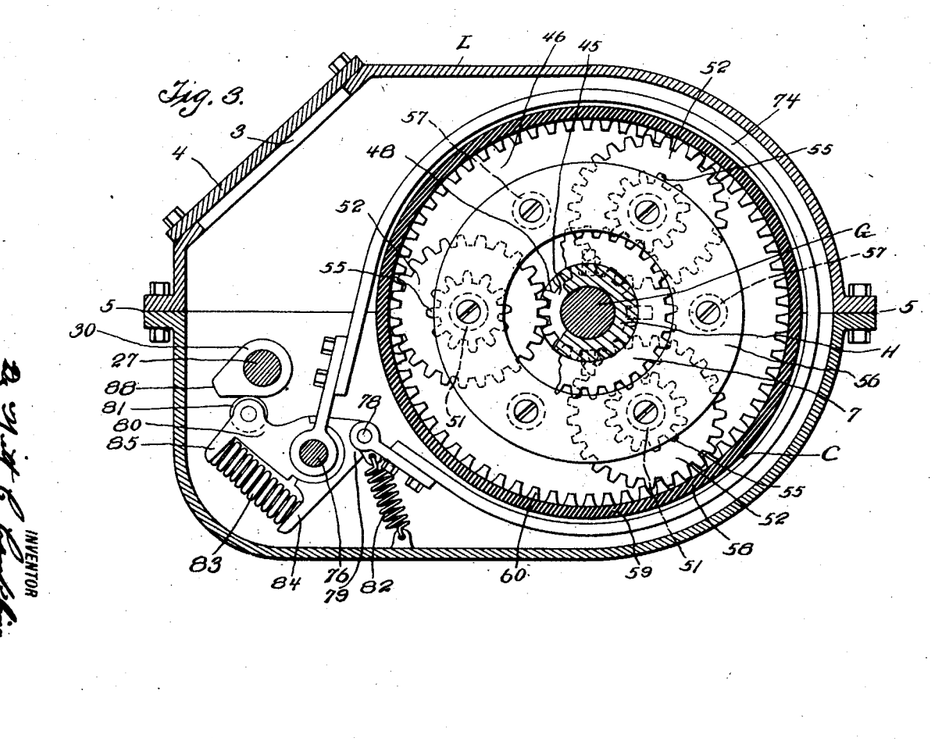
Figure 3 is a similar sectional view taken substantially upon the plane of line III of Fig. 1.
Figure 4:
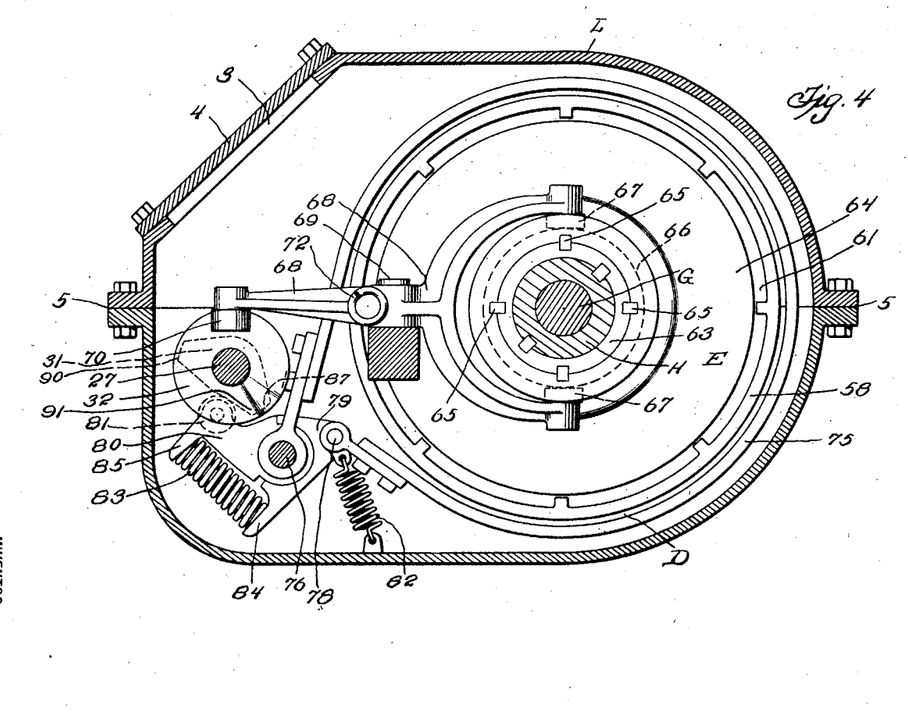
Figure 4 is a further similar sectional view taken substantially upon the plane of line IV of Fig. 1.

The manner of connecting the brake-bands for operation by their respective cams is identical in each instance and is clearly shown in Figures 2, 3 and 4. A tie shaft 76 extends longitudinally of the casing, being fixed by its opposite ends in the end walls of the casing. It is arranged parallel with the cam shaft 27 and may be supported intermediate its length from said cam shaft as by means of the braces 77.

In each case one end of the brake-band is tied to the shaft 76 while the opposite end is fixed, as at 78, to an arm 79 of a bell-crank lever which is pivotally mounted upon the shaft 76. The other arm as 80, of the bell-crank lever carries a roller 81 which stands in position at all times to be operated by its respective cam 29, 30 or 31. A spring 82 engages between the arm 79 and the adjacent wall of the casing normally to urge the brake-band into an off position, and to hold the roller 81 against the cam.

The two arms 79 and 80 of the bell-crank lever are preferably separately formed and are pivotally connected together by means of the shaft 76 in such manner as to provide a desirable movement of the arm 80 after the arm 79 has been tightened, or approximately tightened. A heavy compression spring 83 is interposed between suitable lugs 84 and 85 formed upon the respective arms 79 and 80 to hold them in one position relatively to each other. When the brake-band has been tightened, and the arm 79 thereby retarded, continued movement of the arm 80 will compress the spring and apply an added resilient pressure tending further to swing the arm 79, thus causing the brake-band to be gradually tightened until it reaches its final degree of tightness with the roller 81 resting on the point of the cam.

The lost motion between the two arms of the bell-crank lever also compensates for or counter-acts, deficiencies which may occur, in the accuracy with which the parts of the brake mechanism are manufactured and assembled.

It is believed that the operation of the device may now be readily understood by referring particularly to the diagrammatic views, Figures 5 to 10.

Figure 1:
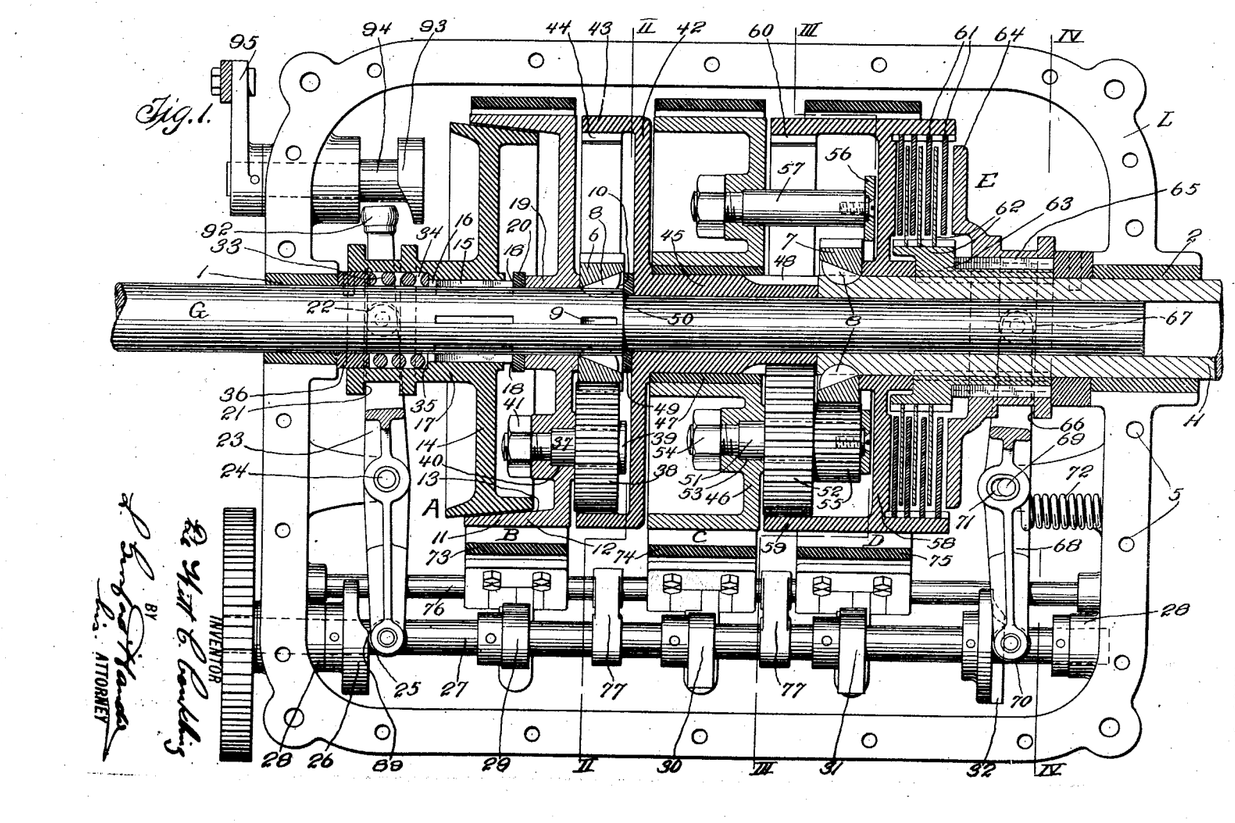
Figure 1 is a longitudinal sectional view through a gear mechanism constructed in accordance with this invention.

In Figure 1, the five different clutches or brakes included in the device are indicated respectively: A the main clutch, B the reverse brake, C the low-speed brake, D the second-speed brake, E the high-speed clutch.

Figure 5:
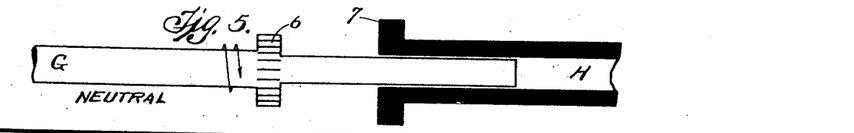
Figures 5, 6, 7, 8 and 9 are diagrammatic views for graphically illustrating the condition of the various parts of the device at different times, the stationary elements being illustrated in solid black.

When all of the clutches are off the parts are in "neutral" position. The clutch member 14 which is fixed to the shaft transmits no motion to its drum. The gear 6 which is fixed to the shaft may rotate the gears 38 but these will simply float around idly, and the shaft H will stand stationary with the drive shaft rotating within its bore, as shown in Figure 5.

Figure 6:
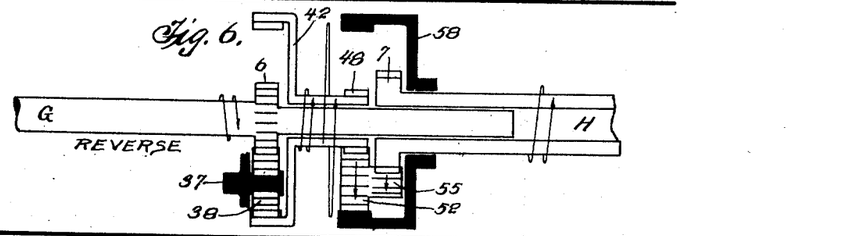

When the brake-band 73 is tightened, and the brake B therefore is on, the spindles 37 are caused to stand stationary and the rotary motion of the gear 6 is consequently transmitted through the gears 38 in a reverse direction to the power-transmission drum 42 causing the hub 45 and gear 48 of said power-transmission drum to rotate relatively slowly in a direction the reverse of the direction of rotation of the drive shaft. At the same time that the brake-band 73 was applied the brake-band 75 was also applied so that the brake D was placed on thus causing the clutch-drum 58 to stand stationary. The gear 48 transmits its motion through the double gears 52—55 to the gear 7 on the shaft H causing said shaft H also to rotate in the same direction as the hub 45. Rotation of the gears 52—55 by the gear 48 causes said gears 52—55 to walk bodily around the gears 48—7 in the same direction as the direction of rotation of the gear 48. This produces a desirably increased speed of rotation of the shaft H over that which would obtain if the spindles 51 of all the gears 52—55 were stationary. The parts are operating in "reverse" as shown in Fig. 6.

Figure 7:
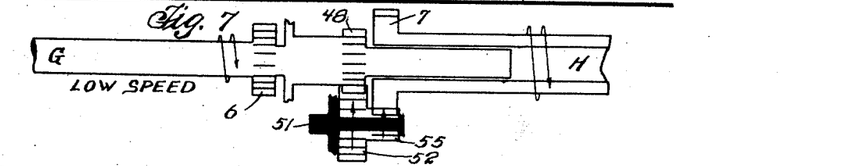

When the clutch A and brake C are on, the spindles 37 move as integral parts of the drive shaft and the rotation of the drive shaft is imparted directly to the power-transmission drum 42 through the gears 38 so that said drum, and its hub with the gear 48, also rotates as integral parts of the drive shaft. The spindles 51 however are held stationary so that the double gears 52—55 are caused to rotate and to transmit the rotation of the drive shaft to the shaft H at a greatly reduced speed due to the difference in diameters of the gears 48, 52, 55 and 7. The "low-speed" condition of the parts is thus in effect as illustrated in Figure 7. The clutch drum 58 may rotate idly in a reverse direction by reason of its engagement with the gear 52 but will perform no function.

Figure 8:
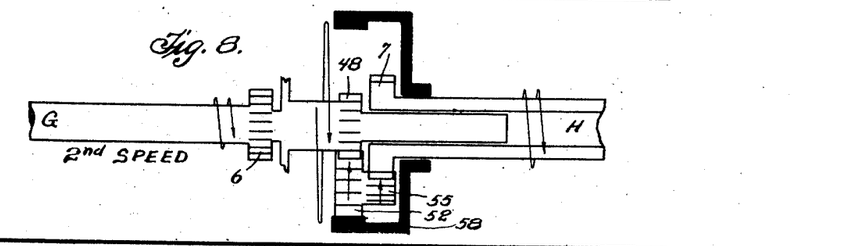

When the clutch A and brake D are on, the spindles 37 move as integral parts of the drive shaft and the rotation of the drive shaft is imparted directly to the power-transmission drum 42 through the gears 38 so that said drum, and its hub with the gear 48, also rotates as integral parts of the drive shaft. The spindles 51 and the double gears 52—55 now are free to swing bodily around the drive shaft and this they do by reason of the engagement of the gear 52 with the internal gear 60 of the stationary clutch drum 58 imparting a rotary motion to the shaft H in the same manner as described with reference to Figure 6. Since the gear 48 now however moves positively with the drive shaft, instead of at a reduced reverse speed as in Figure 6, the direction of movement of the shaft H is the same as that of the drive shaft. The speed is less than the speed of the drive shaft. The "second-speed" condition of the parts is thus in effect as illustrated in Figure 8.

Figure 9:
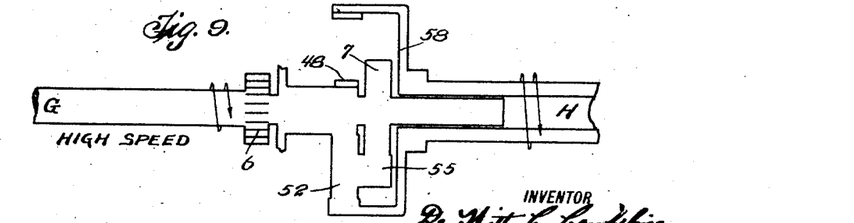

When the clutches A and E are on, the gear 48 moves as an integral part of the drive shaft as described with reference to Figures 7 and 8. The break drum 58 becomes in effect as an integral part of the shaft H so that the double gears 52—55 are locked against rotation about their spindles. The movement transmitted from the gear 48 to the gear 52 is in turn transmitted directly through to the gear 7 and shaft H in the same manner as if all of said parts were integral. The shaft H will travel at the same speed, and in the same direction as the shaft G, and the "high-speed" condition of the parts is thus in effect as illustrated in Figure 9.

Figure 10:
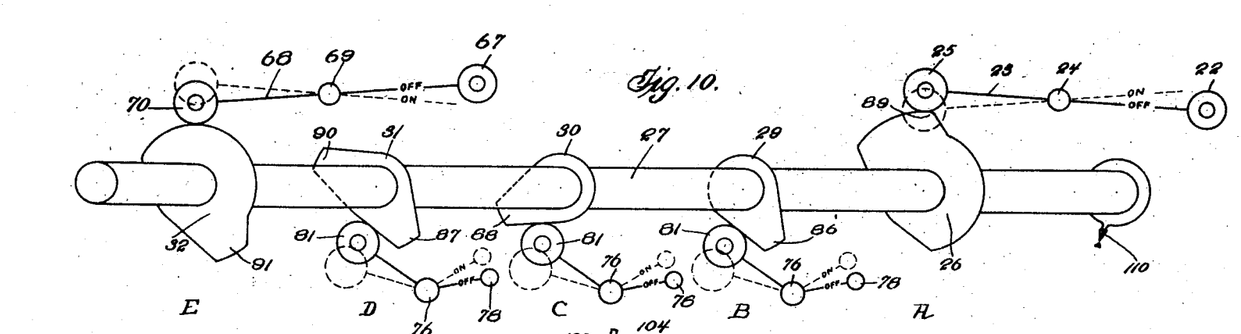
Figure 10 is a diagrammatic view illustrating the relative position of a set of cams employed.

Referring now to the diagrammatic illustration Figure 10, which illustrates the cams and their immediately associated parts, it will be seen that the elements are in their normal or "neutral" positions, that is with the roller 25 of the clutch-shifting lever 23 held on the high point of the control cam 26 and all of the other rollers on the low points of their respective cams, so that all of the clutches and brakes are off.

By rotating the shaft 27 one step in a clockwise direction the high points 86 and 87 of the cams 29 and 31 respectively will lift the adjacent rollers 81 and simultaneously apply brakes B and D. The remaining clutches and brakes will remain open and the device will stand in the "reverse" condition as described with reference to Figure 6.

Return rotation of the shaft in a contraclock-wise direction will release the brakes B and D and the parts will stand again in neutral position as described with reference to Figure 5.

A further rotation of one step in a contraclock-wise direction will carry the high point 88 of the cam 30 beneath its respective roller 81 and at the same time will carry the high point 89 of the cam 26 away from the roller 25. The clutch A and brake C thus will be applied and the device will stand in the "low-speed" position as described with respect to Figure 7.

A still further rotation of one step in a contraclock-wise direction will carry the high point 90 of the cam 31 beneath its respective roller 81. The roller 25 will continue to ride upon the low part of the cam 26. The clutch A and brake D will be applied and the device will stand in the "second-speed" position as described with respect to Figure 8.

A still further rotation of one step in a contraclock-wise direction will carry the high point 91 of the cam 32 beneath its respective roller 70 but roller 25 will continue to ride upon the low part of the cam 26. The clutches A and E thus will be applied and the device will stand in the "high-speed" position as described with respect to Figure 9.

Since, in some cases it may be desirable to release clutch A without necessity for moving the cams on the cam shaft, the clutch-shifting lever 23 is preferably provided with a lug or roller 92 disposed to be engaged by an auxiliary control cam 93 which is fixed to a shaft 94 and which may be operated independently of the cam shaft 27 as by means of a lever 95 which preferably will extend to a convenient position of accessibility exteriorly of the casing L. Normally the cam 93 will stand in a position to permit unobstructed movements of the lever 23 into on and off positions. With the lever in the on position however a slight rotary movement of the cam by means of the arm 95 will instantly swing the lever into the off position without disturbing the position of the cam shaft 27.

When the lever 23 is thus moved to the off position and the clutch A consequently is open, the drive shaft will be free to rotate without transmitting any motion to the shaft H regardless of whether any one or more of the other clutches are held in the on position by their respective cams as described.

Figure 11:
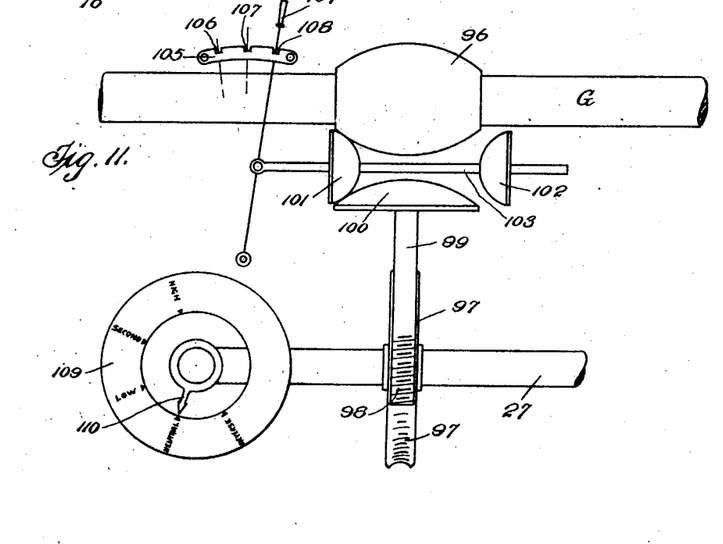
Figure 11 is a diagrammatic view illustrating means whereby the power for changing the movements of the cams may be transmitted from the drive shaft of the device, together with means whereby the transmission may be readily controlled.

As suggested above, the cam shaft 27 may be manually operated if desired. However, in some cases, it may be preferable to drive the cam shaft 27 by means of the power in the drive shaft G. Various means may be resorted to for transmitting this power and for controlling its effect upon the shaft 27. One of such means is diagrammatically illustrated in Figure 11, and it includes a friction ring 96, fixed to the shaft G, a worm gear 97 fixed to the shaft 27, a work pinion 98 operating upon the gear 97 and connected by a shaft 99 to be driven by a friction disc 100 disposed adjacent to the friction ring 96. A pair of friction rollers 101 and 102 is interposed between the disc 100 and the ring 96, being mounted upon a slide-shaft 103 connected to be slid back and forth by a lever 104 or by any other suitable means. The rollers 101 and 102 are arranged so that only one of them will engage the disc 100 and the ring 96 at the same time. The other may be brought into operative engagement by simply shifting the position of the shaft 103. When the shaft is in an intermediate position neither of the rollers will be operating and the shaft 27 will stand stationary. A member 105 may be provided with three notches 106, 107 and 108 for engagement by a part of the lever to determine the position of the rollers. Also, preferably, a dial 109 is provided, and a pointer 110 is connected to be driven by the shaft 27 for traversing said dial to positively indicate to the operator the position of rotation of the shaft 27 so that he may thus properly determine the period of time during which the lever 104 must be held in one or the other of the notches 106 and 108 in order to produce the desired movement of the shaft 27. In an automobile structure this dial and pointer, and the lever 104 or its equivalent should of course be placed in a convenient locality adjacent the driver's seat.

By properly proportioning the sizes of the friction disc, the friction ring, the friction rollers, the worm pinion, and the worm gear, the speed of rotation transmitted to the shaft 27 may be made desirably low so that the movement of the cams on said shaft 27 will be quite slow and steady, and the application or release of the various clutches will consequently be also very gradual and effective.

As many changes could be made in this construction without departing from the scope of the invention as defined in the following claims, it is intended that all matter contained in the above description or shown in the accompanying drawings, shall be interpreted as illustrative only and not in a limiting sense.

Having thus described my invention what I claim as new and desire to secure by Letters Patent is:—

1. A speed-changing device comprising a drive shaft, a driven shaft, variable speed mechanism for connecting said shafts, said variable speed mechanism including a clutch drum, a band encircling the drum, a lever for applying the band to the drum, means for moving a portion of said lever to a given position when applying the band, and means whereby the movement applied to said portion of the lever is resiliently applied to the band whereby to insure gradual application of the band during movement of the mentioned portion of the lever into said given position.

2. In a speed-changing device, a drive shaft, a driven shaft, variable speed mechanism for connecting said shafts, said variable speed mechanism including a clutch, a lever for operating said clutch, said lever being pivoted intermediate its ends, and being connected with the clutch at one end, a cam operative upon the other end of the lever to swing the lever about its pivot, the lever having a transverse slot therein engaging the pivot, a spring engaging the lever to retain one end of the slot against the pivot, the lever being adapted to move to displace the mentioned end of the slot from the pivot when the lever is swung by the cam to apply the clutch, and the spring being adapted to resiliently urge the mentioned end of the slot back toward the pivot and thereby to effect a resilient application of the clutch.

3. In a speed-changing device, a drive shaft, a driven shaft, variable speed mechanism for connecting said shafts, said variable speed mechanism including a clutch, a lever for operating said clutch, said lever being pivoted intermediate its ends and being connected with the clutch by one end, a cam operative upon the other end of the lever to swing the lever about its pivot, the lever having a transverse slot therein engaging the pivot, a spring engaging the lever intermediate the pivot and the cam to serve the double purpose when the clutch is off of holding the lever against the cam and holding one end of the slot against the pivot, the lever being adapted to move to displace the mentioned end of the slot from the pivot when the lever is swung by the cam to apply the clutch, and the spring being adapted when the clutch is on to serve the further purpose of urging the mentioned end of the slot back toward the pivot, whereby to effect a resilient application of the clutch.

4. In a speed-changing device, a drive shaft, a driven shaft, variable speed mechanism operable to connect said shafts, and said variable speed mechanism including a clutch having a part arranged to be pressed against another part longitudinally of one of said shafts, a gear also included in said variable speed mechanism being mounted upon said mentioned shaft disposed to receive the thrust from the clutch, and means for fixing said gear to said shaft comprising a plurality of keys projecting laterally from the shaft and having wedge-like surfaces engaging within inclined slots formed in the gear, substantially described.

5. In a speed-changing device, a drive shaft, a driven shaft, variable speed mechanism for connecting said shafts, said variable speed mechanism including a clutch, a lever for operating said clutch, a cam operative upon the lever to move the clutch "off", said variable speed mechanism including also a clutch drum, a band encircling said drum, a cam for operating said band, a cam shaft upon which both of said cams are mounted, and a further cam also operable upon said lever to move the clutch "off" independently of said first cam.

6. In a speed changing device, a drive shaft, a driven shaft, a gear mounted to rotate upon one of said shafts, a clutch drum mounted to rotate upon the drive shaft, a gear fixed to the drive shaft, a planetary gear carried by the drum constantly meshing with said last mentioned gear, means selectively operable to cause said drum to either rotate with the drive shaft or to stand stationary and to thereby rotate said planetary gear in either a forward or reverse direction at will, means to impart the rotation of said planetary gear to said first mentioned gear, means selectively operable to transmit the rotation of said first mentioned gear to the driven shaft at a plurality of speeds, said last mentioned means comprising a pair of drums, a planetary gear carried by one of said drums constantly meshing with said first gear and with teeth of the second drum, a second gear fixed to rotate with said planetary gear and in constant mesh with teeth provided upon the driven shaft, together with selectively operable means to control rotation of said drums.

7. In a speed changing device, a drive shaft, a driven shaft, a gear mounted upon one of the shafts, means whereby said gear may be driven in either a forward or a reverse direction, and means selectively operable to transmit motion from said gear to the driven shaft at a plurality of speeds, said last mentioned means comprising a pair of drums, a planetary gear carried by one of said drums constantly meshing with said first gear and with teeth of the second drum, a second gear fixed to rotate with said planetary gear and in constant mesh with teeth provided upon the driven shaft, together with selectively operable means to control rotation of said drums.

In testimony whereof I affix my signature.

DE WITT C. CONKLING.